United States Patent [19]
Farah et al.

[11] 3,872,049
[45] Mar. 18, 1975

[54] METHOD FOR PREPARING UREA URETHANE POLYMER PARTICLES

[75] Inventors: Basil S. Farah, Elma; Henry A. Kasprzak, Lackawanna, both of N.Y.

[73] Assignee: Textron, Inc., Providence, R.I.

[22] Filed: Oct. 2, 1973

[21] Appl. No.: 402,722

[52] U.S. Cl. ..................... 260/33.6 UB, 260/75 HE
[51] Int. Cl............................................ C08g 51/28
[58] Field of Search. 260/33.6 UB, 75 HE, 77.5 AA

[56] References Cited
UNITED STATES PATENTS

| | | | |
|---|---|---|---|
| 3,344,121 | 9/1967 | Phellisse et al. | 260/75 NH |
| 3,525,717 | 8/1970 | Butler et al. | 260/75 NE |
| 3,655,627 | 4/1972 | Hutzler et al. | 260/77.5 AA |

*Primary Examiner*—Lewis T. Jacobs
*Attorney, Agent, or Firm*—Morton, Bernard, Brown, Roberts & Sutherland

[57] ABSTRACT

Finely-divided, solid urea-urethane particles are prepared by combining under agitation and in an inert liquid reaction medium, a diamine and an isocyanate-terminated urethane prepolymer of a hydroxy-terminated polyester polyol and essentially hydrocarbon diisocyanate, to provide urea-urethane polymer, said liquid reaction medium containing aromatic hydrocarbon solvent which can swell urea-urethane polymer; and contacting said urea-urethane polymer with aliphatic or alicyclic hydrocarbon liquid to obtain finely-divided, solid urea-urethane particles.

32 Claims, No Drawings

METHOD FOR PREPARING UREA URETHANE POLYMER PARTICLES

The present invention relates to a method of producing finely-divided, solid urea-urethane polymers which are suitable for use in, for instance, electrostatic coating or other dry coating processes, or in forming films. By this invention a solution containing a urethane prepolymer of a hydroxy-terminated polyester and diisocyanate, and an aromatic hydrocarbon solvent for the prepolymer and a swelling agent for urea-urethane polymer, is reacted under agitation with diamine to form urea-urethane polymer. Finely-divided, elastomeric urea-urethane polymer particles which are free flowing can be recovered by contact of the urea-urethane polymer with aliphatic or alicyclic hydrocarbons.

Urea-urethanes have found widespread use in coatings for wood, metal, and the like, due to their advantageous properties such as their ability to rapidly cure, chemical resistance, abrasion-resistance, toughness, elasticity and durability. Conventionally, urea-urethane coatings have been applied as essentially liquid dispersions or solutions in aromatic, and more recently, aliphatic solvents when the urea-urethanes are of certain types. When the coating is being dried, or cured, these solvents are vaporized into the atmosphere. Loss of such solvents to the atmosphere represents an economic loss and the provision of equipment to recover the solvents to prevent their release to the atmosphere is expensive or impractical in many instances, and has not met with complete commercial success. Moreover, the conventional aromatic solvents employed in the production of urea-urethanes are expensive, toxic, odiferous, and photochemically-sensitive, and thus are smog-formers in the daylight atmosphere due to photochemical oxidation.

Powder coating has been suggested and employed as an alternative mode of coating in order to avoid the use of solvents. Other advantages of powder coating besides reduced organic emissions, include almost 100 percent utilization of the coating material since the dry material can be recovered and recycled. The coatings often have better adhesive properties than conventional coatings, and the process enables building thick films in one coating operation, providing a uniform thickness of the coating on the substrate, and, particularly by the use of electrostatic coating processes, uniformly reaching all parts of the substrate.

Despite the advantages proffered by powder coating, urea-urethanes are almost always applied in conjunction with a conventional solvent. In part, the lack of adoption of use of urea-urethanes as powder coatings can be traced to the difficulty in the preparation of suitably sized polymer particles. While many polymers for coatings, such as the acrylics, are susceptible to size reduction by milling and the like, the toughness and elasticity characteristics of urea-urethanes have made such physical size reduction nearly impossible from a commercial standpoint. Even under the severe conditions of cryogenic grinding, urea-urethane polymers retain toughness and flexibility such that the grinding is difficult and uneconomical. It is clear that the development of an economically-feasible process for producing urea-urethane particles which with little, if any, grinding are suitable for use as powder coating is of the utmost importance.

In accordance with this invention, solid, elastomeric urea-urethanes are provided which can be recovered directly from the process of their manufacture in a finely-divided form, or be readily converted by minimal physical treatment to a finely-divided form, which is suitable for use as a powder coating or film-forming material. The method of this invention comprises extending a urethane prepolymer, derived from a hydroxy-terminated polyester polyol, and diisocyanate, with diamine in an aromatic hydrocarbon reaction medium in which the urea-urethane polymer may swell. The urea-urethane polymer is contacted with a normally liquid, aliphatic or alicyclic hydrocarbon in which the urea-urethane is essentially insoluble to provide particulate urea-urethane in a physically stable form which is free-flowing. The aliphatic or alicyclic hydrocarbon which is essentially a non-solvent for the urea-urethane, may be present in either reactant before contact of the diamine with the urethane prepolymer, or it can be added during or after such contact and reaction to form the urea-urethane. If, for instance, it is desired to recover the urea-urethane from the reaction medium by filtration, the filter cake is friable and can easily be milled to provide urea-urethane particles of about the size of the particles apparently formed in the reaction medium.

The urethane prepolymers employed in the method of the invention are made by the reaction of diisocyanates with urethane-forming polyester polyols as essential reactants. In one embodiment of the invention, a major weight portion of the polyol component is solvent-soluble and has a molecular weight of at least about 400. The prepolymers are often in an essentially liquid state, either as the polymer per se or dissolved in a solvent, and the prepolymers are generally stable in the sense that they will not cure to an insoluble gel unless further contacted with water, polyol, polyamine or other active-hydrogen-containing material. These prepolymers generally have a free isocyanate group content of about 1 to 15, for instance, at least about two, and preferably about 2 to 10, weight percent based on the urethane polymer content of the composition.

The essentially hydrocarbon diisocyanates which are particularly useful in preparing the prepolymers employed in the method of this invention are preferably the aliphatic and alicyclic diisocyanates. While aromatic diisocyanates may be employed as the diisocyanate component, they are generally less preferred in applications in which yellowing due to the effects of ultraviolet light, may be undesirable. The diisocyanates can be substituted with non-interfering groups such an aliphatic hydrocarbon radicals, e.g., lower alkyl or other groups having less active hydrogen as determined by the Zerewitinoff test, J. Am. Chem. Soc., 49, 3181 (1927). The diisocyanate often has at least 6 carbon atoms and usually does not have more than about 40 carbon atoms. Diisocyanates of about 8 to 20 carbon atoms in the hydrocarbon group are preferred. Suitable diisocyanates include 2,4-toluene diisocyanate; 2,6-toluene diisocyanate; 1,4-cyclohexane diisocyanate; dicyclohexylmethane 4,4'-diisocyanate; diphenylmethane 4,4'-diisocyanate; 1-isocyanato-3-isocyanatomethyl-3,5,5-trimethylcyclohexane; hexamethylene diisocyanate; methylcyclohexyl diisocyanate; 2,4,4-trimethylhexylmethylene diisocyanate, and the like. The aliphatic and alicyclic diisocyanates employed in the process of this invention generally exhibit good resistance to the degradative effects of ultraviolet light. It is realized that other polyisocyanates can be employed in the present invention providing the urethane prepolymer compositions are not unduly deleteriously affected.

An essential component used in making urethane prepolymers is polyol. At least a major weight portion, preferably about 75 to 100 weight percent, of the polyol component is a hydroxy-terminated polyester polyol of a dicarboxylic acid and polyol, or hydroxy carboxylic acid or lactone. Typically, the ester-containing polyol is obtained by reacting dicarboxylic acid or its anhydride with a polyol at, for instance, a temperature in the range of about 150° to 600°F., or by polycondensing a hydroxy carboxylic acid or lactone at, for instance, a temperature in the range of about 150° to 600°F. The dicarboxylic acid or hydroxy carboxylic acid may often have from 3 to about 30, preferably 4 to about 12 carbon atoms and may be aliphatic, alicyclic, aromatic or mixed structures of these types. The dicarboxylic acid, hydroxy carboxylic acid, or lactone may be substituted with groups which do not deleteriously effect the production of the desired urea-urethane particles. Exemplary dicarboxylic acids and anhydrides which may be employed in this invention are orthophthalic acid, orthophthalic acid anhydride, isophthalic acid, tetephthalic acid, adipic acid, cyclohexane-1,4-dicarboxylic acid, succinic acid succinic acid anhydride, sebacic acid, dimers of olefinically-unsaturated monocarboxylic acids, such as linoleic acid dimer, and the like and their mixtures. Minor amounts of carboxylic acids having three or more carboxylic groups may also be present during formation of the polyester polyols. The hydroxy carboxylic acids which may be employed as a reactant in providing a hydroxy-terminated polyester polyol include, for instance, hydroxycaproic acid, hydroxybutyric acid, hydroxydecanoic acid, hydroxystearic acid, and the like. Useful lactones include caprolactone, butyrolactone, and the like. The phthalic acid polyester polyols are preferred reactants. The polyester polyol component generally has a molecular weight of at least 400, per average molecule, and the overall polyol reactant is composed to a major weight extent of diols, although triols and other polyols having greater than 3 hydroxyl groups as well as their mixtures with diols can be employed. The polyols can be substituted and often have an average molecular weight of up to about 5,000 or more, but preferably have molecular weight of about 400 to 4,000.

Among the variety of polyols which may be reacted with dicarboxylic acid to produce the hydroxy-terminated polyester polyols, as well as supplement the hydroxy-terminated polyester polyol in providing the overall polyol component, are aliphatic, alicyclic, aromatic wherein the hydroxyl group is on an aliphatic carbon, or mixed structures of these types. Particularly desirable polyols are those represented by the formula:

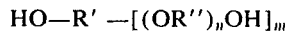
HO—R′—[(OR″)$_n$OH]$_m$ in which R′ is a hydrocarbon radical, preferably aliphatic and saturated, and R″ is an alkylene radical of 2 to 4, preferably 2 to 3, carbon atoms. R′ preferably has 2 to 12, advantageously 2 to 6, carbon atoms. The letter $n$ represents a number from 0 to about 50, depending on the molecular weight desired, while the letter $m$ is 1 to 2 or more.

Among the advantageous low molecular weight polyols for providing the hydroxy-terminated polyester polyols are those having up to about 12 carbon atoms per molecule, for instance, ethylene glycol, 1,2-propanediol, 1,3-propanediol, 1,4-butanediol, 1,3-butylene glycol, trimethylol propane, 1,4-cyclohexane dimethanol, 1,6-hexanediol and the like and mixtures thereof. Diols particularly suitable for supplementing the hydroxy-terminated polyester polyol to provide the overall polyol content include the polyether glycols of up to about 5,000 or more molecular weight, such as the polyoxyethylene glycols, polyoxypropylene glycols and polyoxybutylene glycols. The latter materials include the straight chain polyoxybutylene glycols often referred to as tetramethyleneether glycols, as well as the branched-chain polyoxybutylene glycols, for instance, made from 1,2- and 2,3-butylene oxides.

The urethane prepolymers employed in the method of this invention are stable and preferably are in an essentially liquid state at ambient temperatures, e.g., about 60° to 90°F., at least when in a solvent. There may be a greater tendency to produce intractable prepolymer gels when the polyol contains a cross-linking component which has at least 3 hydroxyl groups per molecule. The prepolymer compositions of the present invention may include those in which at least a portion of the polyol reactant has at least 3 hydroxyl groups per molecule such as those mentioned before, including the polyols of the defined formula where $m$ is 2 or more, e.g., trimethyolpropane, trimethylolethane, 1,2,6-hexanetriol, etc., and their alkylene-oxide derived polyethers. However, the amount or degree of functionality of the polyols should not be so great that an intractable or non-reactive prepolymer is obtained. Such cross-linking aliphatic polyols often have about 3 to 12, preferably about 3 to 6, carbon atoms, although their alkylene-oxide derived polyethers may have molecular weights of at least about 400. It may be desirable to limit the hydroxyl groups supplied by the cross-linking polyol up to about 30, preferably up to about 10, mol percent based on total hydroxyl groups.

The polyurethane prepolymer reaction products employed in the present invention can be made by simultaneously reacting an excess of diisocyanate and polyol. Alternatively, the diisocyanate can be reacted with part or all of one or more of the polyols prior to the reaction with remaining portion of these materials. Stepwise mixing of the diisocyanate with polyols may be used to enhance temperature control. The reaction temperatures for making the various urethane prepolymers are often up to about 150°C., with about 50° to 130°C. being preferred. The reaction is preferably continued until there is little, if any, unreacted hydroxyl functionality remaining. Preferably, the prepolymer isocyanate content is about 2 to 10 percent of the prepolymer solids. As noted above, variations and nature and amounts of polyol and polyol mixtures used in the preparation of the compositions of the method of this invention can be made.

Catalysts can be used in forming the prepolymers to accelerate the rate of reaction. Typically, the catalyst can be organo-tin compounds, for example, dibutyltin diacetate, dibutyltin dilaurate and stannous octoate. Other useful catalysts include tertiary aliphatic and alicyclic amines, such as triethyl amine, tri-n-butyl-amine, triethylene diamine, alkyl morpholines, e.g., N-lauryl morpholine, and the like. Complex mixtures which contain such catalysts in modified form may also be employed.

The urethane prepolymers employed in the method of this invention can be prepared in the presence of a solvent which is essentially inert to the reaction. While it may not be necessary to employ the solvent during formation of the urethane prepolymer, the use of a solvent may be desirable to maintain the reactants in the liquid state as well as permit better temperature control during the reaction by serving as a heat sink and, if desired, as a refluxing medium. In any event, the prepolymer is in solution during its reaction with diamine to form the urea-urethane. The solvent is preferably essentially aromatic hydrocarbon in nature, although other solvents may be employed with or instead of the aromatic hydrocarbon solvent, providing that they do not deleteriously affect the formation of the finely-divided, urea-urethane particles. If the other solvent may deleteriously affect the production of the urea-urethane particles, it may be removed prior to formation of the urea-urethanes. Exemplary of other solvents which do not contain reactive hydrogen are esters, ethers, keto-esters, ketones, glycol-ether-esters, chlorinated hydrocarbons, aliphatic and alicyclic hydrocarbons, pyrrolidones, hydrogenated furans, and the like and mixtures thereof. The amount of solvent employed, if any, can vary widely, and large volumes of solvent may be uneconomical and may provide prepolymers with undesirably or inconveniently low viscosity. Often about 0.01 to 10 parts by weight of solvent, preferably about 0.02 to 5 parts by weight of solvent, per part by weight of the total diisocyanate and polyol in the prepolymer can be used. Among the preferred aromatic solvents include common solvents such as toluene, xylene, ethyl benzene, mesitylene, cumene and the like. It is preferred that the solvent not contain more than about 15 carbon atoms per molecule and often the solvent has from about 5 to 10 carbon atoms.

The chain-extension of the urethane prepolymer with diamine is conducted in an inert, liquid medium. The diamines which are employed to provide the urea-urethane product of this invention can be selected from a variety of suitable diamines. The preferred diamines have aliphatic or alicyclic structures. The aliphatic or alicyclic diamines contribute to the improved extension resistance of the urea-urethane products to the degradative and yellowing effects of ultraviolet light as compared with aromatic diamines. Often the diamine is an essentially hydrocarbon primary diamine having 1 to about 40 or more carbon atoms, preferably about 2 to 15 carbon atoms, and may contain other substituents which do not have hydrogen atoms as reactive with isocyanate groups as the primary amine groups. Secondary amines may be used in the chain extension reaction. Aside from the diamine, a minor amount of other polyamine reactant can be present. Among the useful diamines are ethylene diamine, propylene diamine, 1,4-butylene diamine, piperazine, 1,4-cyclohexyldimethylamine, hexamethylene diamine, trimethylhexamethylene diamine, menthanediamine, 4,4'-diaminodicyclohexylmethane, etc. Preferred diamines are the alkyl or cycloalkyl diamines, e.g., 1-amino-3-aminomethyl-3,5,5-trimethyl cyclohexane. The urethane prepolymer can be reacted with one or more of these primary diamines to obtain the solid urea-urethane product.

It is essential that the chain extension of the prepolymer be conducted in the presence of a normally liquid aromatic hydrocarbon which is a swelling agent for the urea-urethane. Often, the aromatic hydrocarbon has from about 5 to 15 or more carbon atoms. Exemplary of the aromatic hydrocarbons are toluene, xylene, ethyl benzene, mesitylene, cumene, and the like. The amount of solvent employed may depend on the nature and molecular weight of the urethane prepolymer, the size of urea-urethane particles desired, the degree of agitation of the reaction medium, the reactivity of the diamine, the amount and type of other solvent present, if any, the swelling action of the solvent on the urea-urethane product, the desired urea-urethane product, and the like. The amount of aromatic hydrocarbon solvent provided during the chain-extension reaction is sufficient to insure that that urethane prepolymer is in solution as well as being sufficient to swell the urea-urethane polymer. The amount of aromatic hydrocarbon solvent and other components in the inert reaction medium should not unduly dissolve or adversely affect the production and maintenance of the finely-divided urea-urethane solids in the reaction medium. Frequently, the aromatic hydrocarbon solvent will comprise at least about 10, preferably about 25 to 100, weight percent of the reaction medium. Often the aromatic hydrocarbon will be provided in an amount of from about 0.5 to 10, preferably about 1 to 5, times the weight of the urethane prepolymer. As the amount of aromatic hydrocarbon is increased, the particle size of the urea-urethane polymer tends to be smaller; however, excessive amounts of aromatic hydrocarbon may swell the urea-urethane polymer to an extent which particulate urea-urethanes cannot be produced. On the other hand, a sufficient amount of organic medium should be present to prevent the formation of a gelled polymer mass.

In order to prepare the finely-divided urea-urethane particles of this invention, the swollen urea-urethane polymer is contacted with aliphatic or alicyclic hydrocarbon liquid. The amount of aliphatic or alicyclic hydrocarbon liquid employed serves to stabilize particulate urea-urethane and reduce the tendency of the urea-urethane particles to agglomerate. The aliphatic materials may, for instance, be normal paraffins or be branched chain paraffins, and the alicyclic hydrocarbons include the branched or unbranched cycloparaffinic or naphthenic hydrocarbons. The hydrocarbons may contain a minor amount of olefinic unsaturation. From an economic standpoint, there is usually employed a mixture of hydrocarbons which are generally separated or made from mineral oil sources, especially from petroleum. Accordingly, the most economically feasible materials are mineral oil distillates such as mineral spirits, petroleum ethers, and VM&P naphtha of appropriate hydrocarbon constituency. Other suitable non-solvent liquids are n-hexane, n-heptane, n-octane, isoheptane, isooctane, isopentane, 2,3,3-trimethyl pentane, 2,4,5-trimethyl pentane and the like and mixtures thereof. The aliphatic or alicyclic hydrocarbon liquid may contain minor amounts of other liquids such as aromatic hydrocarbons or oxygen-containing material. The aliphatic or alicyclic hydrocarbon used as the non-solvents for the urea-urethanes may boil primarily in the range of up to about 400°F. or more, preferably, for sake of handling convenience, from about 80° or 100°F. to 400°F. VM&P naphthas may often boil essentially below about 300°F., while mineral spirits may boil primarily in the range of about 300° to 400°F. The aliphatic or alicyclic hydrocarbon solvent may have a maximum Kauri-Butanol value of about 50, whereas organic solvents which are aromatic, for instance, xylenes, have a Kauri-Butanol value of about 100. The amount of aliphatic or alicyclic hydrocarbon used is frequently about 0.1 to 20, preferably about 0.5 to 10, times the weight of the urea-urethane polymer. Often, the weight ratio of aliphatic or alicyclic hydrocarbon to aromatic hydrocarbon solvent may be in the range of about 0.1:1 to 10:1, preferably about 0.5:1 to 2:1.

The aromatic reaction medium employed may be filtered off or otherwise separated from the urea-urethane particles prior to the addition of the paraffinic or alicyclic hydrocarbon nonsolvent, but this is less preferred since an additional process step is required.

The chain extension of the urethane prepolymer is conducted in a liquid reaction medium. The liquid reaction medium contains the swelling agent, with or without the aliphatic or alicyclic hydrocarbon nonsolvent. The diamine may be present in the reaction medium and the urethane prepolymer added thereto, or the urethane prepolymer can be in the reaction medium, in which case, a swelling agent can be provided in the reaction medium, and the diamine added thereto.

The amount of aliphatic or alicyclic hydrocarbon contacted with the urea-urethane polymer and the relative time of its addition will involve the consideration of several factors. As indicated above, the particle size of the urea-urethane is, in part, dependent on the degree of swelling of the urea-urethane polymer in the reaction medium. The degree of swelling of the urea-urethane polymer is, in turn, influenced by the concentration of aromatic hydrocarbon solvent in the reaction medium, the nature of the aromatic hydrocarbon solvent, the susceptibility of the urea-urethane polymer to swelling by the aromatic hydrocarbon solvent, the time of contact of the aromatic hydrocarbon solvent, and the like.

In one aspect of the invention, it has been found that the aliphatic or alicyclic hydrocarbon may be combined with the aromatic hydrocarbon solvent before or during the contact and reaction between the prepolymer and diamine to provide the desired degree of swelling of the urea-urethane polymer and produce stable, finely-divided, solid urea-urethane particles more or less directly from the reaction medium. On the other hand, the non-solvent may be added subsequent to the contact and reaction between the prepolymer and diamine and provide the desired, finely-divided urea-urethane particles. The aliphatic or alicyclic solvent may also be contacted with the urea-urethane when the polymer has swelled sufficiently to provide the desired particle size of urea-urethane solids. If swelling of the urea-urethane polymer is permitted to be excessive before contact with the non-solvent, the desired polymer particles may not form. The non-solvent may also be combined in incremental amounts with the reaction medium at various times from before to after the contact and reaction between the prepolymer and diamine. In the case where the aliphatic or alicyclic hydrocarbon is absent or not in a sufficient amount to provide stable urea-urethane particles, the urea-urethane polymer may be in physical forms ranging from swollen, meta-stable particles which will coalesce to a viscous suspension. The contact with the aliphatic or alicyclic hydrocarbon serves to precipitate the urea-urethane particles. The determination of the most desirable, relative amounts of aromatic hydrocarbon solvent and non-solvent and the time of contact with the non-solvent to provide finely-divided, solid urea-urethane particles of a desired particle size from a given polyester-containing urethane polymer and diamine can be readily accomplished.

The reaction medium in which the chain extension reaction between the urethane prepolymer and diamine is accomplished, is maintained under thorough agitation, or mixing. If the agitation is not thorough, portions of the urethane prepolymer and amine may react, at least in portions of the reaction vessel to form intractable gels or to form solid particles which are outside of the desired size range. The severity of agitation may have an effect on the size of the urea-urethane particle formed with smaller particles tending to be formed under more sever agitation speeds. The agitation should be sufficiently severe such that a majority, preferably at least about 70 percent, of the urea-urethane product is in small particle form, e.g. with particle diameters of at least about 0.001 inch, say up to about 0.1 inch or more, and preferably about 0.002 to 0.05 inch. If desired, larger particles may be produced employing the process of this invention; however, it may be most advantageous to provide smaller particles of urea-urethanes by this invention. The severity or extent of agitation may easily be determined by those skilled in the art by observing the size of urea-urethanes produced at various agitator speeds for a given prepolymer, diamine and organic medium to prepolymer ratio, and selecting the speed which provides the desired particle size. Further information regarding mixing is provided in, for instance, the *Chemical Engineer's Handbook*, Third Edition, page 1195 et seq.

The chain extension can be conducted at elevated, reduced or ambient temperatures. Conventient temperatures are from about 10° to 120°C. or more, preferably from about ambient temperature to about 100°C. Elevated pressures may be employed, however, the chain extension reaction is normally conducted at e.g., ambient pressure to about 5 atmospheres, for the sake of economy. Overall reaction can be for a period of a few seconds, minutes or up to several days, and generally it is desired to continue the reaction until a good yield of urea-urethane solids is obtained. Generally, the diamines employed in the method of this invention react rapidly with the urethane prepolymer.

The diamine or urethane prepolymer is preferably gradually added to the reaction medium which contains the other of the diamine or urethene prepolymer, over a period of time in order to prevent the occurrence of localized high concentrations of the added reactant which may lead to forming an intractable gel of the urea-urethane in the reaction medium. When employing high concentrations of the reactants in the reaction medium, it is preferred that the combination of the diamine and prepolymer be less rapid that when the reactants are less concentrated. For instance, when the reactants are in relatively low concentration in the reaction medium and the medium is well agitated, the diamine and prepolymer can be quickly combined. Frequently, the rate of addition of the diamine which is the preferred procedure, will be in the range of from about 0.5 to 150 or more, preferably 1 to 100, grams of diamine per kilogram of total prepolymer per minute. The rate of addition of diamine may, in part, depend upon the degree of agitation of the reaction medium and the speed with which the diamine is dissipated in the reaction medium. For sake of handling convenience, the diamine may be in solution or suspended in a solvent, e.g., an aromatic solvent or aliphatic or alicyclic solvent which is compatible with the reaction medium. Exemplary solvents are those which may be employed as the organic reaction medium.

When the urethane prepolymer is the reactant added to the reaction medium, it is preferably in a medium containing the swelling agent. Preferably, about 0.1 to 50 or 100 parts by weight of urethane prepolymer per 100 parts of reaction medium may be added per minute. The rate of addition of the prepolymer may, in part, depend on the degree of agitation of the reaction medium, the speed at which the prepolymer is dissipated in the reaction medium, the concentration of diamine in the reaction medium and the like.

The amounts of the urethane prepolymer and diamine reactants and the reaction conditions are chosen such that substantially all of the isocyanate content of the prepolymer is reacted on a weight basis. Thus, an approximately stoichiometric amount of amine is used and the free isocyanate content of the urea-urethane is usually less than about 1 weight percent based on polymer solids, and often the free isocyanate content is less than about 0.5%. It is preferred that the diamine not be in excess in the presence of the urethane prepolymer. Excess diamine, however, can be used if the intensity of agitation is sufficiently high to give the desired small particle form-product of this invention.

The reaction medium may include in addition to the urethane prepolymer and reaction medium, a plasticizer. The plasticizer may serve to modify the properties of the resultant urea-urethane and has been found particularly beneficial for lowering the fusion temperature of the urea-urethane particles used in electrostatic coating and the like, to a level suitable for process equipment and product coating processes. Suitable plasticizers include the polybenzoate esters of the following formula

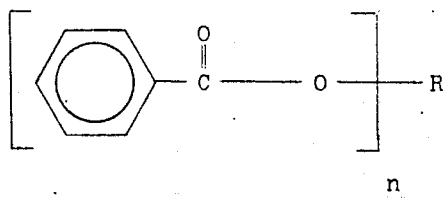

wherein $n$ is an integer from 2 to 4 and R is a lower alkyl group or lower alkyl ether of, for instance, a lower branched alkyl, e.g., —CH$_2$—CH$_2$—CH(CH$_3$)—O—CH(CH$_3$)CH$_2$— or

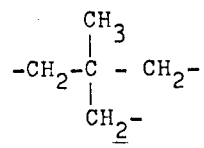

These plasticizers are commercially available from the Velsicol Chemical Corporation as Benzoflex plasticizers.

An emulsifying agent can also be present in the reaction system, and the agent can be cationic, anionic or nonionic and is advantageously the latter. Conveniently, the emulsifier or surface-active agent can be used in amounts of about 0.01 to 30 or more, preferably, about 0.02 or 2, weight percent of the reaction medium. The amount of surface-active agent employed can be affected by the chemical structure of the agent or the reactant. The presence of an excessive amount of surfactant may detract from the physical properties of the product, for instance, in terms of tensile strength and elongation. It may be desirable in certain cases to wash the urea-urethane particles with, for instance, water to remove water soluble surfactant. A useful type of nonionic surfactants are the hydroxyl-containing surface-active agents including those corresponding to the formula

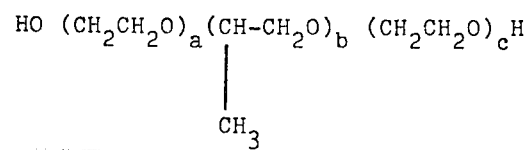

wherein $a$ and $c$ are numbers from about 80 to 150, and $b$ is a number from about 30 to 70. In these surface-active agents, $a + c$ constitute at least about 65 percent, preferably at least about 75 percent, up to about 95 percent of $a + b + c$. Also, these surface-active agents are normally solid and usually have molecular weights of about 8,000 to 20,000, preferably about 12,000 to 17,000. These materials are commercially available as Pluronic polyols, e.g., Pluronic F108, in which F indicates a solid form, 10 represents that $b$ is of such value that polyoxy propylene groups have a total molecular weight of about 3,250, i.e., $b$ is about 56, and $a$ indicates that $a + c$ is about 80% of $a + b + c$. Thus, Pluronic F-108 has a molecular weight of about 16,250.

Another type of nonionic surface-active agent which can be employed is of the formula:

wherein $x$ is about 15 or 20 to 100, preferably about 20 to 60, and R is a hydrocarbon radical of about 10 to 20 carbon atoms, preferably without olefinic or acetylenic unsaturation. Typically, R can be a normal or branched chain alkyl group, as in the case of ethoxylated fatty alcohols, or an alkylphenyl radical. In the latter, the alkyl group often has about 5 to 12 carbon atoms, preferably 8 to 10, for instance 9, carbon atoms. These surface-active agents are commercially available from The General Aniline and Film Corporation as ethoxylated nonyl phenyls such as the Igepal CO surfactants which are designated by a three-digit number. For instance, in Igepal CO-890, $x$ is 40 and thus the ethylene oxide groups constitute about 89 weight percent of the agent. In Igepal CO-850, $x$ is 20 and the weight percent of ethylene oxide is 80, while in Igepal CO-995, $x$ is 100 and the ethylene oxide is 95 weight percent.

To facilitate recovery of the urea-urethane particles prepared in accordance with this invention, an inert coating material may be added to the reaction mixture before, during or after the formation of the urea-urethane particles. Exemplary of the inert coating materials which may be employed is silica having an average particle size of about 0.5 to 20, preferably about 1 to 10, microns in diameter. Such micron-size silica particles are commercially available as Syloid silicas from the Davison Chemical Division of W. R. Grace & Co. The finely-divided silica may be provided in the amount of up to about 10, frequently 0.05 to 5, weight percent based on the urethane prepolymer.

The urea-urethane particles, which have been contacted with the non-solvent hydrocarbon, may be separated from the liquid medium, by, for instance, vacuum filtration. A filter cake of the urea-urethanes of the present invention may be easily broken apart. Generally, the filter cake may be dispersed and dried at about 100° to 300°, preferably about 120° to 250°F. During the drying, the evaporating solvents may be recovered and recycled. The dried urea-urethane product is friable and may be easily milled, for instance, ball-milled, to separate the particulate urea-urethanes of the present invention and provide a free-flowing particulate material.

The urea-urethanes of this invention can be employed in various ways desired to take advantage of the characteristics of the product, for instance, the urea-urethanes may be used as coatings, e.g., by fluidized bed coating and the like, adhesives, laminates or flocculants or formed into relatively thick sheets or film-like materials. Thus, the urea-urethanes provided by this invention are suitable for use in injection molding, extrusion, blow molding, rotational molding and the like. Due to the elastomeric properties of the product, they may be applied and employed in a manner to take advantage of such characteristics. The film-type products generally have a thickness of up to about 100 mils or more and often the coating compositions have a thickness of up to about 10 mils. The urea-urethanes can be formed into various materials or articles of greater cross-sectional dimensions, and can be employed in the various ways known in the art for utilization of these types of materials.

In the preparation of the particulate urea-urethanes in accordance with this invention, additives such as heat stabilizers, levelling agents, anti-cratering agents, fillers, pigments, colorants, dyes, sedimentation inhibitors, ultraviolet-light absorbers, and the like may be introduced prior to the addition of the diamine to the urethane prepolymer. The additives may be intimately dispersed in the reaction mixture and become an integral part of each individual urea-urethane particle when formed. Alternatively, the additive may be introduced after the urea-urethane polymer has been obtained, in which case the additive can be incorporated on the surface of the polymer, or the additive may be mechanically dispersed in dry urea-urethane particles at a later stage in the operation.

Useful fillers and pigments include clays, titanium dioxide, carbon blacks, ground silica, and the like. Suitable heat stabilizers include phosphites such as tris-nonylphenyl phosphite, triphenyl phosphite, didecylphenyl phosphite, and the like. Other heat stabilizers may also be used such as t-butylphenol, t-butylcresol, 2,6-di-t-butyl-4-cresol, 2,6-di-t-butyl-4-hydroxymethylphenol, laurylthio-dipropionate, substituted benzotriozoles, and the like. The amount of additive employed may depend upon the property ultimately desired in the final product. The additive may comprise only a few parts per million of the urea-urethane by weight or it may exceed the weight of the urea-urethane, for example, when the additive is pigment or filler. The solid substrates bearing the coating may be specially treated materials, including final members impregnated with fire resistant chemicals or coated with a sealant.

The urea-urethane particles produced by the method of this invention may find particularly beneficial application in powder coatings. The most promising means of powder coating is by electrostatic spraying. The powder may accept a positive or negative charge and be attracted to an oppositely charged substrate. As the coating thickens, the layer of charged urea-urethane particles on the substrate will repel additional powder and thereby prevent it from being deposited on the surface. Thus, the process has an automatic cut-off point. The powder on the substrate may then be baked in an oven, for instance, at 300° to 700°F., preferably about 300° to 600°F., to fuse the powder. Any powder not placed on the surface of the substrate and fused thereon may be recovered for reuse. Other techniques for applying powder coatings are roll coating, flock coating, fluidized bed coating, flame spraying, electrostatic fluidized bed coating, and by the use of an electrostatic cloud chamber. The urea-urethane products of this invention provide powder coatings having good functional properties and uniformity of coating, even over sharp edges, corners, and projections on substrates.

The invention will be illustrated further by the following examples. All parts and percentages are by weight unless otherwise indicated.

EXAMPLE I

A hydroxy-terminated, polyester diol is prepared by admixing 2,280 parts by weight of 1,6-hexanediol with 2,070 parts by weight of orthophthalic acid anhydride under a nitrogen atmosphere. The mixture is gradually heated. When the mixture is at a temperature of about 248°F., 1.9 parts by weight of tetrabutyl tin catalyst are added. The temperature of the mixture is gradually increased to 482°F. over a period of time of about 4.5 hours from the time of addition of the catalyst, and the water produced during the polymerization is distilled from the reaction mixture. The reaction mixutre is held at a temperature of 482°F. for about 0.5 hour. The product is analyzed and is found to exhibit an —OH number 137.4, and a viscosity at room temperature of 274 seconds.

EXAMPLE II

A urethane prepolymer is prepared by admixing 5,000 parts by weight (11.4 equivalents) of a polyester diol prepared by the procedure essentially described in Example I, said diol having an —OH number of 128, 2,700 parts by weight (20.6 equivalents) of 1-isocyanato-3-isocyanatomethyl-3,5,5-trimethylcyclohexane, and 1,950 parts by weight of toluene. The mixture is stirred without heating for 15 minutes, and then the mixture is gradually heated to 190°F. in 2 hours. After the first 15 minutes of heating (temperature of mixture is 145°F.), 1.0 part by weight of tin octoate catalyst is added. The product solution is analyzed and is found to exhibit a free NCO value of 3.49 weight % based on prepolymer, a viscosity of 97.4 seconds, and a Gardner Color of 3 minus.

EXAMPLE III

To 4,500 parts by weight of toluene is added over a 15 minute period of time in a Cowles dissolver at 1,900 rpm 1,500 parts by weight of a urethane prepolymer prepared essentially by the procedure described in Example II. Then 52 parts by weight of finely-divided (micron-sized) silica particles available under the trade name Syloid 72 from the Davison Chemical Division of W. R. Grace & Co., are added to the mixture along with 3 parts by weight of Pluronic F-108, a polymer having a molecular weight of 3,250 containing 80 percent by weight of hydrophilic polyoxyethylene groups and 20 percent by weight of hydrophobic polyoxypropylene groups, which is available from Wyandotte Chemicals Corporation. The mixture is continuously agitated employing a speed of 5,900 rpm in the Cowles blender. After 15 minutes, a mixture of 110 parts by weight of 1-amino-3-aminomethyl-3,5,5-trimethylcyclohexane in 300 parts by weight of toluene is added gradually over a period of about 5 to 10 minutes. After about two-thirds of diamine solution has been added, the reaction mixture passes from a syrupy state to a mixture containing finely-divided solids which are swollen with toluene. As the solids appear, the reaction mixture becomes less viscous.

While maintaining agitation, another portion of 52 parts by weight of Syloid 72 are added to the reaction mixture. After about one-half hour, 3,000 parts by weight of low flash V M & P naphtha are added to the reaction mixture and the speed of the Cowles dissolver is reduced to about 3,500 rpm. After 15 minutes, the mixture is suction filtered to recover the solids. The filter cake is broken up and dried on trays at about 158° to 167°F., after which it is ball-milled and sieved. About 45 to 60 percent of the ball-milled solids pass through a 140 msh screen (U.S. Sieve Series). A film is prepared from the recovered solids by heat pressing for 45 seconds at 302°F. and 6,000 psi on a Carver press. The film exhibited a tensile strength of about 5,500 to 6,000 psi, an elongation at break of about 240 to 260 percent, a tear strength of about 1,100 to 1,300 psi, and a Shore D hardness of 75.

EXAMPLE IV

To 4,500 parts by weight of toluene is added in a Cowles dissolver at 1900 rpm, 3 parts by weight of Pluronic F-108. To the mixture is added over a period of time of 15 minutes, 1,500 parts by weight of a urethane prepolymer prepared essentially by the procedure described in Example II. 75 Parts by weight of trimethylolethane benzoate available as Benzoflex S432 from Velsicol Chemical Corporation, is then added to the mixture and the speed of the Cowles dissolver is increased to and maintained at about 5,900 rpm. After 15 minutes of the high speed agitation, a mixture of 110 parts by weight of 1-amino-3-aminomethyl-3,5,5-trimethyl cyclohexane in 300 parts by weight of toluene is continuously and at a uniform rate, added to the mixture over a one hour period.

While continuing the agitation, 26 parts by weight of Syloid 72 are added to the reaction mixture. After about one-half hour, 3,000 parts by weight of VM & P naphtha of Example III are added to the mixture and in about 10 minutes, the speed of the Cowles dissolver is reduced to about 3,500 rpm. A fine powder is observed to separate from the reaction mixture upon the addition of the VM & P naphtha. The powder is suction-filtered, spun dry in a centrifuge, and spread on trays to be dried at about 160°F. The product of this example is found to have a lower fusion temperature than the product of Example III due to the presence of the benzoate plasticizer and is glossier in appearance since less silica is employed.

EXAMPLE V

This example illustrates the preparation of polyester polyols for use in accordance with this invention.

Prepolymer A

A mixture of 136 parts by weight of a polylactone diol having a hydroxyl number of about 56 and derived by the polycondensation of ε-caprolactone with dipropylene glycol, 237 parts by weight of a similarly derived polylactone diol having a hydroxyl number of 135, 76 parts by weight of trimethylol propane, 541 parts of 1-isocyanato-3-isocyanatomethyl-3,5,5-trimethylcyclohexane, 0.5 parts by weight dibutyl tin dilaurate catalyst and 1,500 parts by weight xylene are heated at 90°C. until the reaction mixture achieves a constant isocyanate content indicating complete reaction of the available hydroxyl groups. The prepolymer solution obtained has a non-volatile content of 40 percent and an NCO content of 3.24 weight percent based on prepolymer.

Prepolymer B

A mixture of 664 parts by weight of a neopentyl glycol adipate polyester having a hydroxyl value of 80, 440 parts by weight of a 1,6-hexanediol adipate having a hydroxyl value of 109 and 508 parts by weight of dicyclohexylmethane diisocyanate are heated at about 90° to 95°C. for about 2 hours, after which the reaction mixture is diluted with 400 parts by weight of dry toluene, to produce a prepolymer solution having an isocyanate content of 4.0 weight percent on prepolymer.

Prepolymer C

A mixture of 300 parts by weight dicyclohexylmethane diisocyanate and 570 parts by weight of an ethylene propylene adipate copolyester having a hydroxyl value of about 90 is heated at 90°C. for 4 hours essentially according to the procedure employed in preparing Prepolymer B, to produce a prepolymer having an NCO content of 4.7 weight percent based on prepolymer.

Prepolymer D

A solution of 517 parts by weight of a diethylene glycol adipate having a hydroxyl value of about 220 and 483 parts of 1-isocyanato-3-isocyanatomethyl-3,5,5-trimethylcyclohexane in 250 parts by weight of dry toluene is heated at about 95°C. for 4 hours. The prepolymer solution has an NCO content of 6.9 weight percent based on prepolymer.

Prepolymer E

A polyester mixture consisting of 2,052 parts by weight of an ethylene-propylene glycol adipate copolyester having a hydroxyl number of 35 and 267 parts by weight of a similar copolyester having a hydroxyl number of 91 is heated with 473 parts by weight dicyclohexyl methane diisocyanate at about 100° to 120°C. for about 2 hours, after which the reaction mixture is diluted with 700 parts by weight toluene to produce a solution having an NCO content of 2.0 weight percent based on prepolymer.

Prepolymer F

A mixture of 900 parts by weight of a neopentyl glycol adipate polyester having a hydroxyl number of about 125 and 524 parts by weight of dicyclohexyl methane diisocyanate are heated at 90°C., in an inert atomosphere, for 3 hours then diluted with 360 parts by weight of dry toluene. The product has an isocyanate content of 4.92 weight percent based on prepolymer.

Prepolymer G

A mixture of 500 parts by weight of a 1,6-hexanediol orthophthalate polyester having a hydroxyl value of about 140, 270 parts by weight dicyclohexyl methane diisocyanate, 195 parts by weight toluene and 1.0 part by weight dibutyl tin dilaurate catalyst is heated at 90°C. for about 3 hours to produce a prepolymer containing 3.5 weight percent NCO based on prepolymer.

Prepolymer H

A solution of 1498 parts by weight of a 1,6-hexanediol-orthophthalate polyester having a hydroxyl value of about 140, in 530 parts by weight dry toluene, is stirred and treated with 982 parts by weight dicyclohexylmethane diisocyanate, under a nitrogen atmosphere. The mixture is heated at 70°C. for 4 hours to produce a prepolymer solution containing 5.12 weight percent NCO based on prepolymer.

Prepolymer I

A solution of 800 parts by weight of a poly 1,6-hexanediol-orthophthalate polyester having a hydroxyl value of about 50 and 183 parts be weight of dicyclohexyl methane diisocyanate in 350 parts by weight toluene is heated at 76°C. for 1 hour then allowed to stand at room temperature. The prepolymer solution has an NCO content of 2.4 weight percent based on prepolymer.

Prepolymer J

A reaction mixture consisting of 1000 parts by weight of a poly 1,6-hexanediol-orthophthalate polyester having a hydroxyl value of about 140, 968 parts by weight of dicyclohexylmethane diisocyanate and 474 parts by weight toluene is heated at 90°C. for 3 hours to produce a clear prepolymer solution having an NCO content of 6.4 weight percent based on prepolymer.

EXAMPLE VI

A mixture of 6.4 parts by weight of 1-amino-3,5,5-trimethyl-3-cyclohexyl methylamine, 200 parts by weight toluene, 150 parts by weight mineral spirits, 10 parts by weight tris-nonylphenyl phosphite and 1.0 parts by weight of Igepal CO-630 (a nonylphenoxypoly(ethyleneoxy)ethanol containing 65 percent ethylene oxide groups) is placed in a Waring Blender and stirred at high speed for 5 minutes while 100 parts by weight of prepolymer A is added in a thin stream. The resulting suspension is stirred five additional minutes then filtered to recover 33 parts of a very fine powder which can be heat pressed at 165°C. and 6,000 psi to clear, hard and solent resistant films.

EXAMPLE VII

One hundred parts by weight of prepolymer B is dissolved in 200 parts by weight toluene and 100 parts by weight mineral spirits. One part by weight of Igepal CO-630 is then added, and the solution is stirred rapidly in a blender. To the stirred solution there is added 7 parts 4,4'-diaminodicyclohexyl methane dissolved in 100 parts of mineral spirits, as rapidly as possible. The reaction mixture is then stirred 15 minutes, treated with 100 parts by weight water, filtered and washed with 500 additional parts by weight water. The product is oven-dried at 75°C. for several hours, ground in a ball mill for 15 hours and then sieved. The powder has the following particle size distribution:

33% Thru 20 mesh on 40 mesh
56% Thru 40 mesh on 60 mesh
10% Thru 60 mesh on 100 mesh
1% Thru 100 mesh on 120 mesh

EXAMPLE VIII

A solution of 130 parts by weight of prepolymer B, 170 parts by weight toluene, 5.0 parts by weight 4,4'-dicyclohexylmethane diisocyanate, 1.0 part by weight Igepal CO-630 and 200 parts by weight mineral spirits is treated with 16.0 parts 4,4'-diaminodicyclohexyl methane essentially as described in Example VII above. The water washed, dried and pulverized product has the following particle size distribution:

30.4% Thru 40 on 60 mesh
46.9% Thru 60 on 100 mesh
7.6% Thru 100 on 120 mesh
15.5% Thru 120 mesh The powder could be heat pressed to clear, tough, flexible films.

EXAMPLE IX

A solution of 20 parts by weight 1-amino-3,5,5-trimethyl-3-cyclohexylmethylamine in 1,000 parts by weight hexane is heated at reflux in a 3-neck flask equipped with a stirrer and an additional funnel. To the solution is added 400 parts by weight prepolymer C dissolved in 100 parts by weight toluene, over about a one-half hour period. The resulting mixture is stirred for 1 hour and the product is recovered in the form of finely-divided, thermoplastic powder particles.

EXAMPLE X

A suspension of 100 parts by weight prepolymer C in 100 parts by weight toluene and 100 parts by weight mineral spirits is stirred rapidly in a blender and 1.0 part by weight Igepal CO-630 surfactant is added thereto. The resulting emulsion is rapidly stirred and 10 parts by weight melted 4,4'-diaminodicyclohexylmethane are added. Stirring is continued for an additional 15 minutes after which the reaction product is recovered by filtration. There is produced a nearly quantitative yield of fine powder, most of which is in the 150–200 micron size.

EXAMPLE XI

One hundred parts by weight of prepolymer D, 10 parts by weight trisnonylphenyl phosphite and 1.0 part by weight Igepal CO-630 surfactant are dissolved in 300 parts by weight xylene and 100 parts by weight mineral spirits and the mixture is stirred rapidly in a Waring Blender. To the rapidly stirred mixture there is added 28 parts by weight of a 1:1 mixture of xylene and 1-amino-3,5,5-trimethyl-3-cyclohexyl methylamine over about a 5 minute period of time. The solid product which separates out is recovered by filtration and then dried at 75°C. overnight. A very fine powder is obtained which can be fused to clear hard films having a tensil strength of 3,500–4,000 psi, a 50% elongation at break and a tear strength of about 1,170 pli.

EXAMPLE XII

The procedure of Example XI is essentially repeated except that 5.0 parts by weight of 1-isocyanato-3,5,5-trimethyl-3-cyclohexylmethane isocyanate are intimately mixed with prepolymer D immediately before use, and 36 parts by weight of the xylene and 1-amino-3,5,5-trimethyl-3-cyclohexylmethylamine mixture are used instead of 28 parts. The powder obtained fuses readily at about 450°F. to provide clear films which have good solvent resistance. The films are not attacked by mineral spirits, xylene, methyl isobutyl ketone, perchloroethylene or trichloroethylene. They are, however, swollen by lower molecular weight alcohols and highly polar solvents such as N,N-dimethyl formamide.

EXAMPLE XIII

A solution of 100 parts by weight prepolymer E and 1.0 part by weight Pluronic F-108 in 250 parts by weight toluene and 200 parts by weight mineral spirits is stirred rapidly, and a solution of 4.1 parts by weight 1-amino-3,5,5-trimethyl-3-cyclohexyl-methylamine in 50 parts by weight toluene is added dropwise over about a 30 minute period of time. A powder is obtained, which, after drying, can be heat pressed at 155°C. and about 10,000 psi into continuous, tough films having a tensile strength of 7,000 psi, maximum elongation at break of 800%, and tear strength of 430 pli.

EXAMPLE XIV

Four hundred parts by weight prepolymer F is blended thoroughly at high speed in a one gallon Waring Blender with 1,400 parts by weight toluene, and 4.0 parts by weight Igepal CO-630 surfactant is introduced. To the emulsion is added a solution of 35 parts by weight 1-amino-3,5,5-trimethyl-3-cyclohexyl methylamine in 100 parts by weight toluene and 500 parts by weight of mineral spirits are added immediately thereafter. The reaction mixture is stirred 30 minutes and then filtered. The product is washed once with petroleum ether then dried in an oven at 50°C. to constant weight. The product is obtained in the form of a fine powder which passes a 120 mesh screen and can be heat pressed into clear tough films with a tensile strength of 7,000 psi, 350% ultimate elongation at break and tear strength of 700 pli. The films have a Shore hardness of about 50 on the D scale. The powder can be electrostatically sprayed onto metal substrates and fuses to clear glossy films upon baking in an oven at about 250°C.

EXAMPLE XV

The procedure of Example XIV is essentially repeated except that 32 parts by weight titanium dioxide are thoroughly dispersed in the prepolymer solution prior to addition of the diamine. The product obtained is a fine powder which on heating at about 250°C. fuses to a glossy, smooth, white film. The film retains its whiteness and high gloss after exposure for 1,000 hours in a weatherometer.

EXAMPLE XVI

The procedure of Example XV is essentially repeated except that the amount of TiO$_2$ used is 8 parts by weight. The product obtained is a fine powder with the following particle size distribution:

```
16.8% through 20 on 60 mesh
28.6% through 60 on 150 mesh
18.4% through 150 on 170 mesh
36.2% through 170 mesh
```

The powder is heat pressed at 160°C. and 8,000 psi to a tough, flexible, white film with the following properties:

| | |
|---|---|
| Tensile Strength | 4500 – 5500 psi |
| Ultimate Elongation at break | 300% |
| Tear Strength, Die C | 850 pli. |

EXAMPLE XVII

In this example a suspension of 100 parts by weight Hysol Drikote DK12-02 Blue in 500 parts by weight prepolymer G, 500 parts by weight mineral spirits, and 1750 parts by weight toluene containing 1.0 part by weight Pluronic F-108 surfactant is used and added thereto while the suspension is undergoing agitation are 48 parts by weight 1-amino-3,5,5-trimethyl-3-cyclohexyl methylamine in 250 parts by weight toluene over about a 30 minute period. The resulting blue suspension is stirred one-half hour then the product is recovered by filtration to provide a nearly quantitative yield of fine powder with a particle size finer than 140 mesh.

EXAMPLE XVIII

Five hundred parts by weight of prepolymer H are dissolved in 1,750 parts by weight toluene, and to the solution, while being agitated, are added 26 parts piperazine in an additional 250 parts by weight toluene over about a 5 minute period. The resulting mixture is diluted with 500 parts mineral spirits to produce a fine powder which is recovered by filtration. The powder after drying has a particle size finer than 140 mesh.

EXAMPLE XIX

One hundred parts by weight prepolymer I is treated with 4.1 parts by weight 1-amino-3-5,5-trimethyl-3-cyclohexylmethylamine essentially as in Example XIII to produce a powder product suitable for extrusion and other plastic forming processes. The powder is heat pressed at about 155°C. and about 10,000 psi into a continuous, tough film having a tensile strength of 7,000 psi, 800% elongation at break and tear strength of 430 pli.

EXAMPLE XX

Four hundred parts by weight prepolymer J is treated essentially as in Example XIV with 1-amino-3,5,5-trimethyl-3-cyclohexyl methylamine to produce a fine powder suitable for electrostatic coating application.

The powder is electrostatically sprayed onto Bonderite steel panels using a Gema Model 71 electrostatic powder spray gun sold by Interrad Corporation of Riverside, Connecticut. A negative charge equivalent to 75 kilo volts is applied to the particles in the gun causing them to adhere firmly to the steel panels. Upon heating in an oven at 500°F. for 5 minutes, a smooth, high gloss film is produced. The film is resistant to both acids and alkalis, and is not attacked by common organic solvents.

EXAMPLE XXI

A powder pigmented with titanium oxide is produced by first dissolving 800 parts by weight of prepolymer G in 2,640 parts by weight toluene and suspending 32 parts by weight titanium oxide in the solution which contains 13.0 parts by weight of Igepal CO-630 as a surfactant. The suspension is stirred vigorously in a Waring Blender, and 84 parts by weight 1-amino-3-aminomethyl-3,5,5-trimethyl cyclohexane are added over a 2 minute period with 2,640 parts by weight of mineral spirits being added immediately thereafter to provide the powder. After stirring an additional 15 minutes, the reaction mixture is filtered to recover a fine white powder in 82% yield which after drying has the following particle size distribution:

36% on 60 mesh
18% through 60 on 140 mesh
29% through 140 on 70 mesh
17% through 170 mesh A sample of the powder is heat pressed into opaque white sheets, using a carver press at 5,000 psi and about 150°C. The sheets have tensile strengths of 4,500–5,500 psi, ultimate elongation at break of 280–350 percent and tear strengths of 840–865 pli, after aging 24 hours at 25°C. and 50% relative humidity.

It is claimed:

1. A method for preparing finely-divided, urea-urethane particles comprising combining under agitation and in an inert liquid, aromatic hydrocarbon-containing reaction medium, diamine and isocyanate-terminated urethane prepolymer of hydroxy-terminated polyester polyol and essentially hydrocarbon diisocyanate to provide urea-urethane polymer, said liquid reaction medium containing sufficient aromatic hydrocarbon solvent which swells urea-urethane polymer, to dissolve the isocyanate-terminated urethane prepolymer; and contacting the urea-urethane polymer with aliphatic or alicyclic hydrocarbon liquid to obtain urea-urethane particles.

2. The method of claim 1 wherein the free isocyanate content of the urethane prepolymer is about 2 to 10 weight percent of polymer solids.

3. The method of claim 1 wherein the diamine is employed in an approximately stoichiometric amount for combination with the isocyanate-terminated, urethane prepolymer.

4. The method of claim 3 wherein the free isocyanate content of the urea-urethane polymer is less than about 0.5 weight percent.

5. The method of claim 1 wherein the liquid reaction medium is provided in an amount of about 0.5 to 10 times the weight of the urethane prepolymer.

6. The method of claim 5 wherein the liquid reaction medium contains at least about 10 weight percent aromatic hydrocarbon solvent.

7. The method of claim 1 wherein aliphatic or alicyclic hydrocarbon liquid is present, with either the diamine or isocyanate-terminated, urethane prepolymer, prior to combination of diamine and isocyanate-terminated, urethane prepolymer.

8. The method of claim 7 wherein the liquid reaction medium contains at least about 10 weight percent aromatic hydrocarbon solvent.

9. The method of claim 1 wherein aliphatic or alicyclic hydrocarbon liquid is contacted with the urea-urethane polymer subsequent to the combination of diamine and isocyanate-terminated, urethane prepolymer.

10. The method of claim 1 wherein the hydroxy-terminated, polyester polyol is of dicarboxylic acid or anhydride having 4 to about 12 carbon atoms and polyol having up to about 12 carbon atoms.

11. The method of claim 10 wherein the dicarboxylic acid is orthophthalic acid.

12. The method of claim 1 wherein the hydroxy-terminated, polyester polyol is of a hydroxy carboxylic acid or lactone.

13. The method of claim 1 wherein the aromatic hydrocarbon solvent has from about 5 to 15 carbon atoms.

14. The method of claim 1 wherein the aliphatic or alicyclic hydrocarbon liquid is a mineral oil distillate.

15. The method of claim 1 wherein the weight ratio of aliphatic or alicyclic hydrocarbon liquid to aromatic hydrocarbon solvent is about 0.1:1 to 10:1.

16. The method of claim 1 wherein the urea-urethane particles have particle diameters of about 0.001 to 0.1 inch.

17. The method of claim 1 wherein the liquid reaction medium contains 0.02 to 2 weight percent surface-active agent based on the reaction medium.

18. The method of claim 17 wherein the surface-active agent is nonionic.

19. The method of claim 1 wherein micron-size silica particles are contacted with the urea-urethane polymer.

20. The method of claim 1 wherein the diamine is an essentially hydrocarbon primary diamine of 1 to about 40 carbon atoms.

21. The method of claim 1 wherein the essentially hydrocarbon diisocyanate has about 6 to 40 carbon atoms.

22. A method for preparing finely-divided, urea-urethane particles comprising combining under agitation and in an inert liquid, aromatic hydrocarbon-containing reaction medium, essentially hydrocarbon primary diamine of 1 to about 40 carbon atoms and isocyanate-terminated urethane prepolymer having a free isocyanate content of about 2 to 10 weight percent polymer solids, said prepolymer being of hydroxy-terminated, polyester polyol having a molecular weight of about 400 to 4,000, and an essentially hydrocarbon diisocyanate of about 6 to 40 carbon atoms, to provide urea-urethane prepolymer, said liquid reaction medium comprising at least 10 weight percent aromatic hydrocarbon solvent which swells the urea-urethane polymer, to dissolve the urethane prepolymer; and contacting the urea-urethane polymer with aliphatic or alicyclic hydrocarbon liquid which boils primarily in the range of from about 80° to 400°C. to directly produce from the reactive medium, urea-urethane particles having particle diameters of about 0.001 to 0.1 inch, wherein the weight ratio of aliphatic or alicyclic hydrocarbon liquid to aromatic hydrocarbon solvent is in the range of about 0.1:1 to 10:1.

23. The method of claim 22 wherein the liquid reaction medium is provided in an amount of about 0.5 to 10 times the weight of the urethane prepolymer.

24. The method of claim 22 wherein aliphatic or alicyclic hydrocarbon liquid is present in the liquid reaction medium prior to combination of diamine and isocyanate-terminated, urethane prepolymer.

25. The method of claim 22 wherein aliphatic or alicyclic hydrocarbon liquid is contacted with the urea-urethane polymer subsequent to the combination of diamine and isocyanate-terminated, urethane prepolymer.

26. The method of claim 22 wherein the hydroxy-terminated, polyester polyol is of dicarboxylic acid or anhydride having 4 to about 12 carbon atoms and polyol having up to about 12 carbon atoms.

27. The method of claim 26 wherein the dicarboxylic acid if orthophthalic acid.

28. The method of claim 22 wherein the hydroxy-terminated, polyester polyol is of a hydroxy carboxylic acid or lactone.

29. The method of claim 22 wherein the aliphatic or alicyclic hydrocarbon liquid is a mineral oil distillate.

30. The method of claim 22 wherein the liquid reaction medium contains 0.02 to 2 weight percent surface-active agent based on the reaction medium.

31. The method of claim 30 wherein the surface-active agent is non-ionic.

32. The method of claim 22 wherein micron-size silica particles are contacted with the urea-urethane polymer.

* * * * *